United States Patent [19]

Cutler et al.

[11] Patent Number: 4,829,027
[45] Date of Patent: May 9, 1989

[54] LIQUID PHASE SINTERING OF SILICON CARBIDE

[75] Inventors: Raymond A. Cutler, Bountiful; Anil V. Virkar; Andrew C. Hurford, both of Salt Lake City, all of Utah

[73] Assignee: Ceramatec, Inc., Salt Lake City, Utah

[21] Appl. No.: 185,370

[22] Filed: Apr. 21, 1988

Related U.S. Application Data

[63] Continuation of Ser. No. 2,146, Jan. 12, 1987, abandoned.

[51] Int. Cl.[4] .............................................. C04B 35/56
[52] U.S. Cl. ........................................ 501/89; 264/56; 264/65
[58] Field of Search ...................... 501/89; 264/56, 65

[56] References Cited

U.S. PATENT DOCUMENTS

| | | | |
|---|---|---|---|
| 4,097,293 | 6/1978 | Komeya | 501/89 |
| 4,141,740 | 2/1979 | Cutler | 106/44 |
| 4,146,379 | 3/1979 | Copley | 501/88 |
| 4,158,687 | 6/1979 | Yajima | 501/95 |
| 4,341,533 | 7/1982 | Daire | 501/87 |
| 4,502,983 | 3/1985 | Omori et al. | 106/44 |
| 4,569,922 | 2/1986 | Suzuki | 501/89 |
| 4,581,295 | 4/1986 | Deliso | 501/98 |

FOREIGN PATENT DOCUMENTS

| | | | |
|---|---|---|---|
| 188129 | 7/1986 | European Pat. Off. | 501/88 |
| 3516587 | 12/1985 | Fed. Rep. of Germany | 501/88 |
| 55-116669 | 9/1980 | Japan | 501/88 |
| 57-17465 | 1/1982 | Japan | 501/88 |
| 57-166370 | 10/1982 | Japan | 501/88 |
| 58-91069 | 5/1983 | Japan | 501/88 |
| 58-91070 | 5/1983 | Japan | 501/88 |
| 58-91146 | 5/1983 | Japan | 501/88 |
| 58-36376 | 2/1985 | Japan | 501/88 |
| 0033263 | 2/1985 | Japan | |
| 391106 | 7/1973 | U.S.S.R. | 501/88 |
| 2133042 | 12/1983 | United Kingdom | 501/88 |
| 2125066 | 2/1984 | United Kingdom | 501/88 |
| 2140823 | 12/1984 | United Kingdom | 501/89 |

OTHER PUBLICATIONS

*Metallurgical and Chemical Engineering*, Mar. 1912, pp. 129–132.

*Primary Examiner*—William R. Dixon, Jr.
*Assistant Examiner*—A. Griffis
*Attorney, Agent, or Firm*—Trask, Britt & Rossa

[57] ABSTRACT

Liquid phase sintering is used to densify silicon carbide based ceramics using a compound comprising a rare earth oxide and aluminum oxide to form liquids at temperatures in excess of 1600° C. The resulting sintered ceramic body has a density greater than 95% of its theoretical density and hardness in excess of 23 GPa. Boron and carbon are not needed to promote densification and silicon carbide powder with an average particle size of greater than one micron can be densified via the liquid phase process. The sintered ceramic bodies made by the present invention are fine grained and have secondary phases resulting from the liquid phase.

17 Claims, 2 Drawing Sheets

LIQUID PHASE SINTERING OF SILICON CARBIDE

GOVERNMENT CONTRACT IDENTIFICATION STATEMENT

This invention was made with government support under Contract No. DE-AC03-84ER80191, awarded by the Department of Energy. The Government has cetain rights in this invention.

This application is a continuation of application Ser. No. 002,146 filed Jan. 12, 1987, now abandoned.

This application is related to co-pending application Ser. No. 161,364 filed on Feb. 2, 1988, which application is pending and which is a continuation of U.S. Ser. No. 038,421 filed on Apr. 14, 1987, now abandoned, which is a continuation of U.S. Ser. No. 778,251 filed on Sept. 20, 1985, now abandoned.

BACKGROUND OF THE INVENTION

1. Field: This invention relates to a composition and method of manufacturing a sintered silicon carbide ceramic body. More particularly, the invention relates to the addition of various mineral oxides to promote the formation of a liquid phase during the densification of silicon carbide.

2. Statement of the Art: Silicon based ceramics are leading candidates for applications in high temperature environments, such as energy conversion devices, due to their high strength at temperatures on the order of 1500° centigrade (°C). Silicon carbide (SiC) and silicon nitride ($Si_3N_4$) also find use in application over a wide temperature range, where either wear resistance or corrosion resistance is required.

Sintering in the absence of applied pressure ("pressureless sintering") of SiC has been accomplished using sintering aids. Sintering aids include boron (B), carbon (C) or boron carbide ($B_4C$) and/or aluminum (or alumina). Sintering aids have been used to obtain nearly single phase SiC with densities greater than 97% of theoretical. (Theoretical density, as is well known in the art, is the density of a fully dense ceramic body.) Very active powders having high surface areas (mean particle size less than 0.5 micrometers) have been heretofore needed to provide the driving force for pressureless sintering.

Sintering of SiC through solid state diffusion typically takes place at temperatures of at least 2050° C. and at times exceeding 30 minutes. Very little densification of SiC particles having sizes greater than one micrometer occurs by the prior art methods of pressureless sintering. Since pressureless sintering allows for the fabrication of complex shapes economically, it would be an improvement in the art if SiC particles in the 1 micrometer range, which are easier to manufacture and handle than 0.5 micrometer particles, could be densified without applied pressure.

Silicon nitride is typically densified, aided by a liquid phase, at temperatures ranging between 1500° C. to 1850° C. for times of at least 30 minutes. The presence of a liquid phase is critical to the process since it allows alpha silicon nitride to be converted into beta silicon nitride. The alpha silicon nitride goes into solution and precipitates out as beta silicon nitride. This treatment leads to an acicular microstructure with increased, fracture toughness. Typical sintering aids used to densify $Si_3N_4$ include MgO, $Y_2O_3$—$Al_2O_3$, $Y_2O_3$—$ZrO_2$, $CeO_2$, and CaO. These oxides and others react with silica present on the surface of the silicon nitride to form a liquid phase at temperatures below 1850° C. Decomposition of $Si_3N_4$ is excessive at temperatures greater than 1850° C. Although $Si_3N_4$ has greater strength and toughness than SiC and is therefore more resistant to catastrophic failure, SiC has higher hardness and is therefore preferred in wear applications. Also, SiC has a higher resistance to creep resistance which may be beneficial in heat engine applications.

Silicon carbide has been sintered to high density and strength using rare earth oxides as additives. U.S. Pat. Nos. 4,502,983 to Omori, et al.; 4,564,490 to Omori et al.; and 4,569,921 to Omori et al. disclose the use of rare earth oxides to promote solid state sintering. These inventions require the use of SiC of submicron size and typically result in surfaces having higher concentrations of rare earth oxides. Virkar, et al. (U.S. patent application Ser. No. 778,251) discloses a method for densifying a mixture of SiC and SiCAlON (a solid solution of SiC, $Al_2OC$ and AlN) using a liquid phase provided by the carbothermal reduction of alumina ($Al_2O_3$). These above techniques do not result in SiC having high hardness, i.e., hardness exceeding 23 gigapascals (GPa) or improved wear resistance.

In this disclosure, unless otherwise indicated, all quantities, proportions, and ratios are stated on a weight basis. All references to "mesh" are to U.S. mesh.

SUMMARY OF THE INVENTION

A pressureless sintered silicon carbide ceramic body having a density of greater than 97% of theoretical formed from SiC particles is disclosed. The silicon carbide ceramic body is densified through the presence of a liquid phase formed by the interaction of about 0.5-19.5% rare earth oxides, or mixed rare earth oxides, with about 0.5-19.5% aluminum oxide included in the ceramic body. Minor quantities of other oxides, especially refractory oxides, may also be present. The resulting ceramic body is greater than about 80% SiC, has an average grain size of less than 10 micrometers, and exhibits a hardness in excess of 20 GPa when tested using a diamond indenter at a load in excess of 50 Newtons (N).

A method for densifying silicon carbide comprising (1) mixing SiC with about 0.5% to about 19.5% rare earth oxides or mixed rare earth oxides, and about 0.5 to about 10% aluminum oxide to form a uniform mixture; (2) forming the powder to the desired shape using conventional ceramic forming techniques (e.g., uniaxial or isostatic pressing, slip casting, injection molding, tape casting or extrusion); and (3) heating the resultant green ceramic body in either an inert atmosphere or vacuum at temperatures from about 1700° C. to about 2200° C. for times varying from about one minute to about 60 minutes so as to densify the material to closed porosity (greater than about 95% of theoretical density). A fourth optional step is the hot isostatic pressing (Hip Ping) of the uncontained sintered component at temperatures between about 1600° C. and about 2000° C. in an overpressure of an inert atmosphere (e.g., argon) greater than about 20 MPa for approximately one to 30 minutes which may further improve the density of the silicon carbide body.

DETAILED DESCRIPTION OF THE INVENTION

Various rare earth oxides in combination with aluminum oxide form liquids upon equilibrium heating at temperatures in the range of scandium about 1600° C. to about 2500° C. Rare earth oxides are defined, for the purpose of this invention, as oxides of yttrium (Y), lanthanum (La), cerium (Ce), praseodymium (Pm), samarium (Sm), europium (Eu), gadolinium (Gd), terbium (Tb), dysprosium (Dy), holmium (Ho), erbium (Er), thulium (Tm), ytterbium (Yb) lutetium (Lu) and indium (In). At subliquidus temperatures, under equilibrium conditions, it is possible to form compounds with molar ratios of rare earth oxide to aluminum oxide of either 1:1 (i.e., La, Nd, Sm, Eu, Y, Er), 2:1 (i.e., Gd, Dy, Ho, Y, Er, Tm, Yb), or 3:5 (i.e., Dy, Ho, Y, Er, Tm, Yb, Lu, (In)). Equilibrium low temperature (less than 1000° C.) phase diagrams show that 1:1, 2:1, and 3:5 compounds can form either compounds are mixtures of compounds or combinations of solid solutions of the rare earth oxides with alumina.

In liquid phase sintering it is desirable to have a liquid which wets the matrix and allows particle rearrangement to occur in the presence of the liquid phase. Densification can be rapid over a narrow temperature range in the presence of a liquid phase. By controlling temperature and time, two principal variables in the sintering process, one can obtain fine grained microstructures. Silicon carbide-aluminum oxide composites have been hot pressed and are known to have excellent wear resistance. Rare earth oxides are also known to be refractory and therefore possess good high temperature characteristics. The addition of rare earth oxides to alumina ($Al_2O_3$) permits the formation of a liquid phase at temperatures of as low as 1630° C. Alternatively, one can choose liquids which form at temperatures up to the melting pointof the oxides themselves.

The present invention takes advantage of liquid formation between a rare earth oxide, e.g., $Y_2O_3$, and alumina to enhance sintering of SiC at temperatures and times which are lower than those heretofore practiced in the art. Also, by proper selection of the liquid phase and sintering condition, the resulting silicon carbide-oxide composite has a grain size of less than 10 micrometers, a density of greater than 97% of theoretical, and a hardness in excess of 24 GPa.

The amount and choice of additives is determined by desired properties in the fired composite. If high temperature properties are desired for components such as wear parts (e.g., automotive applications, cutting tools, support fixtures, or turbine blades), the amount of additive should be low and the oxide phase(s) selected should have a melting point as high as possible. If low temperature applications are desired, such as wear parts in machinery operating at less than 750° C., (e.g., armor) then more additives can be added to promote the sintering of larger silicon carbide particles, and compositions can be adjusted to allow liquids to form at lower temperatures.

Figure 1:
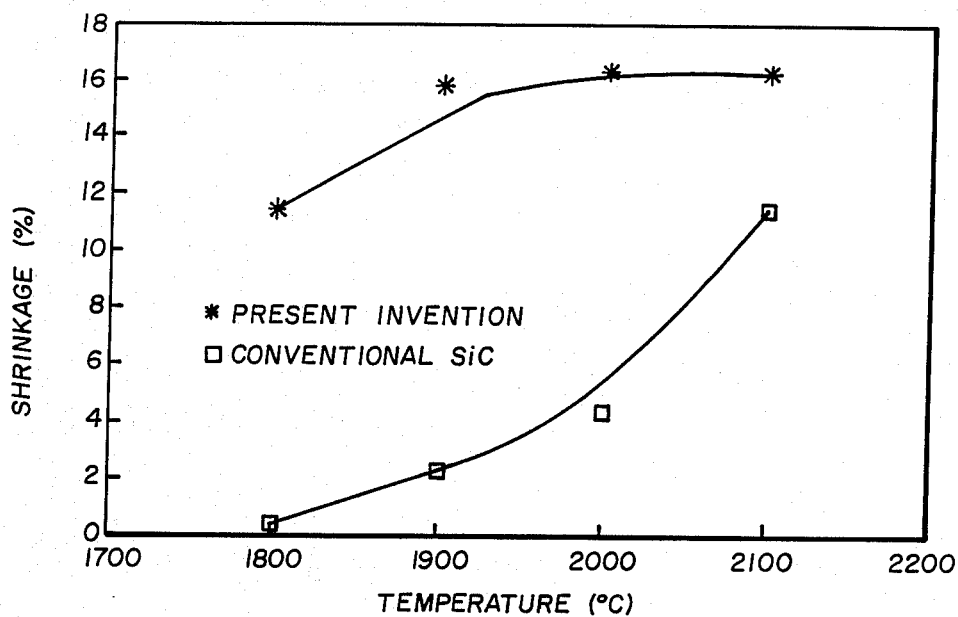
FIG. 1 is a comparison of linear shrinkage of liquid phase sintered SiC (present invention) with conventionally sintered SiC (B, C additions). Note that short sintering time (10 minutes) does not permit densification of conventional SiC where as liquid phase sintered SiC shrinks considerably.
Figure 2:
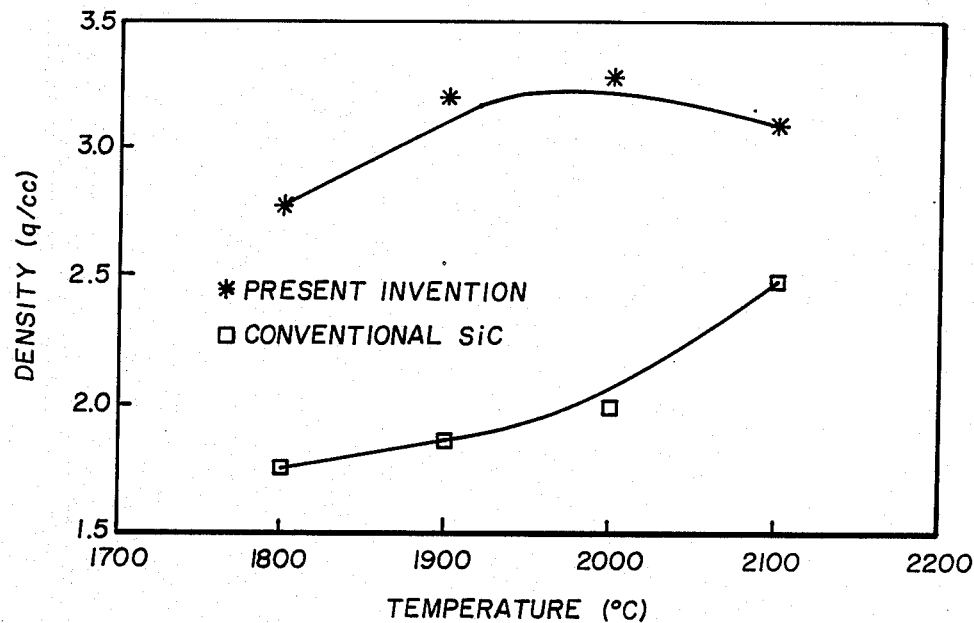
FIG. 2 is a density comparison of the instant invention SiC with conventionally sintered SiC as a function of sintering temperature at sintering time of ten minutes. Note higher density of liquid phase sintered SiC.
Figure 3:
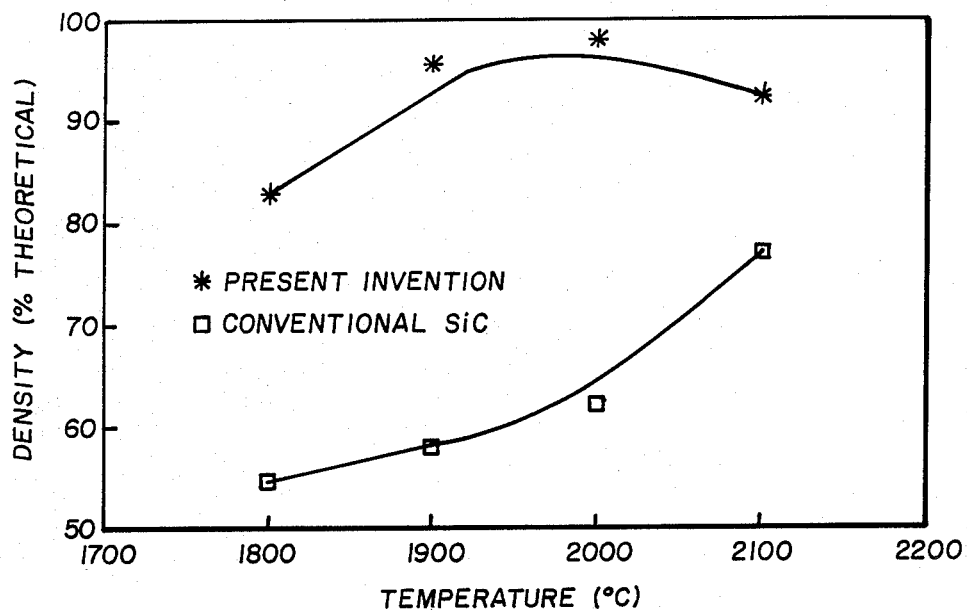
FIG. 3 is a density (percent of theoretical) comparison of present invention SiC with conventionally sintered SiC after holding at sintering temperature for 10 minutes.
Figure 4:
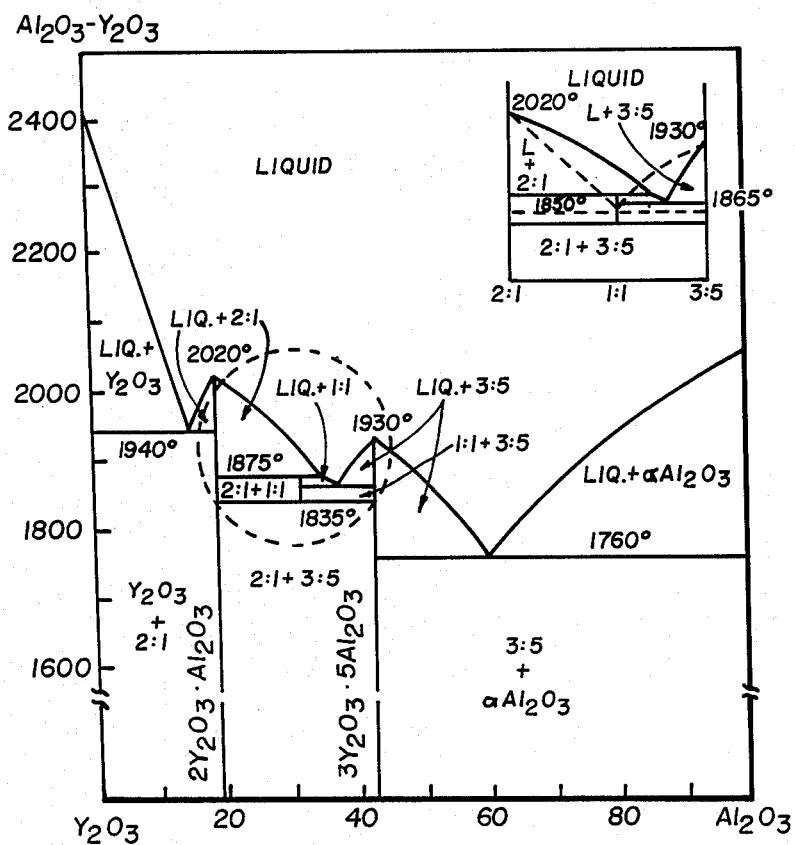
FIG. 4 as reported in N. A. Toropov, I. A. Bondar, F. Ya. Galakhov, X. S. Kikogosyan, and N. V. Vinogradova, *Izv. Adkad. Nauk SSSR, Ser. Khim.*, No. 7, 1162 (1964), FIG. 4 showing the phase equilibra for the $Y_2O_3$—$Al_2O_3$ system.

As shown in FIG. 4, various eutectic, peritectic, and congruent melting liquids can be formed in the yttria ($Y_2O_3$)—$Al_2O_3$ phase field with the lowest melting liquid occurring at about 1760° C. and the highest xelting liquid occurring at 2410° C. The melting point of particular liquid depends upon on the $Y_2O_3$ to $Al_2O_3$ ratio. Thus, the softening point of the grain boundary phase can be altered by varying the rare earth oxide to aluminia ratio.

The choice of composition within the $Al_2O_3$—$Y_2O_3$ system is dictated by the desired ease of processing and the various properties (e.g., oxidation resistance, thermal conductivity, or thermal expansion behavior) desired in the densified ceramic body. The limitation imposed by the present invention is that the liquid phase must wet the SiC and allow sintering to occur at temperatures low enough to permit the formation of a fine grain size. The combination of high density achieved through liquid-phase assisted sintering, and fine grain size achieved by sintering at low temperatures for short times, achieves the desired hardness and wear resistance of SiC.

Theoretically, any of the rare earth oxides in combination with $Al_2O_3$ can be used in the present invention. Also, mixtures of rare earth oxides, such as mishmetal, should be readily substitutable for the individual oxides.

The amount of rare earth oxides is dictated by the desired properties. In order to achieve high hardness, and therefore improved wear resistance, the SiC content of the composite should exceed 80%, and preferably 85%. The greater the SiC content, the greater the resulting hardness. At least about 0.5% rare earth oxide in combination with alumina should be used to activate sintering. High temperature applications may necessitate total oxide additions less than about 5% of the composite. Most current wear applications where SiC is used (use temperatures of less than 1000° C.) allow for up to 20% oxide addition, although it is preferred that the level be less than 15%. Effective results have been obtained with levels as low as 2%.

Conventional processing methods can be used with the present invention. Ball milling (wet or dry), vibratory milling, jet milling, or other milling methods will reduce average particle size. Binders, dispersants, and lubricants may be added to make the powders amenable to conventional processing techniques. If all of the constituents have an average particle size of less than about 5 microns, the powders can be dispersed in solution (aqueous or nonaqueous) and slip cast.

The powders may also be dried by conventional techniques (e.g., by spray drying, freeze drying, air drying, or pelletizing) to allow pressing (uniaxial or isostatic), injection molding, extrusion, or other forming methods to take place. Since the oxides form a liquid phase, they need not be submicron, however, it is desired that they be as well distributed throughout the green ceramic body as possible. Chemical precursors of the oxides may be used to produce the oxides or oxide compounds.

Silicon carbide particles should have a particle size of less than about five microns and preferably less than about two microns. Both alpha and beta SiC may be used. Boron additions are not required, although boron doped powder may still be used. Typical powders have oxygen contents of less than 0.5%, and preferably less than about 0.2%. The surface oxygen reacts with the oxide additives in further lowering the liquidus temperature. Submicron SiC can be used at any additive level, but its use will be most advantageous at levels less than about 5%, or with sintering temperatures less than 2000° C. As with conventional SiC, it is generally desired to obtain as high of a density as possible in the "green state," preferably a green density of greater than 50% of theoretical.

Sintering can be accomplished in conventional resistance or induction heated furnaces. The sintering atmosphere may be either a vacuum or inert atmosphere. An inert atmosphere (argon, helium or nitrogen ($N_2$)) is preferred. Argon and helium are preferred over nitrogen inasmuch as $N_2$ leads to the formation of AlON and AlN which can inhibit sintering and, therefore, increase the required sintering temperature. Either conventional heating rates or rapid heating may be used.

Temperatures in the range of about 1600° C. to about 2300° C. may be used, although a temperature range of about 1900° C. to about 2100° C. is preferred. Processing time above the liquidus temperature should be limited so as to inhibit grain growth. This time should preferably be less than about 120 minutes, with time at the sintering temperature preferably less than about 60 minutes. As will be recognized by those skilled in the art, heating schedules may be adjusted based on furnace load. Ceramic bodies which have been pressureless sintered to closed porosity can optionally be hot isostatically pressed (Hipped) to improve their density as will be recognized by those skilled in the art.

Through the disclosed process, SiC having a hardness greater than about 26 GPa can be made. The SiC is sintered at temperatures less than 2000° C. with treatment times of less than about 10 minutes. By comparison, conventional sintered silicon carbide (i.e., sintered with boron and carbon sintering) is sintered at temperatures near 2100° C. with treatment times of approximately one hour. Conventional sintered silicon carbide has a density near 97% of theoretical and hardness of approximately 24 GPa. Also, the fine grain size obtainable through the use of the present invention manifests itself in higher strength, with four-point bend strengths 60% higher than conventionally sintered silicon carbide.

However, due to the presence of the non-transient liquid phase, applications requiring temperatures above 1400° C., might still require conventionally sintered SiC due to its excellent creep resistance. Most applications, however, do not require such creep resistance and would benefit substantially from a quicker, more economical process of making highly wear resistant SiC.

The invention is further clarified by the following examples. Examples 1 through 7 show the sintering enhancement due to the liquid phase produced by $Y_2O_3$ and $Al_2O_3$ additions. Example 8 shows that sintering of mixed systems, such as SiC with $TiB_2$, is possible. Example 9 shows that the rare earth addition to SiCAlON, a system already employing a transient liquid phase, promotes sintering.

EXAMPLES 1-6

Silicon carbide (345.0 grams (g), Ibiden ultrafine) having an average particle size of about 0.5 micrometers, $Al_2O_3$ (35.4 g, Reynold's HP-DBM), and $Y_2O_3$ (19.6 g, Rhone Plonc 99.99%) were milled for 24 hours in a stainless steel ball mill with 1000 milliliters (ml) n-hexane, 2 g dispersant (PA-78B, Witco Chemical Co.), and 4 kilograms (kg) WC-6%Co grinding media for 24 hours. The powder picked up 3.47% WC-6Co upon milling. The powder was wet screened −325 mesh and dried in a rotary-evaporative dryer. The powder was dry screened −40 mesh before uniaxially pressing at 35 MPa, followed by isostatic pressing at 200 MPa. The disc shaped specimens were sintered in Argon gas at temperatures between 1850° C. and 2000° C. for 10 minutes. The specimens were sintered in two modes: (a) inside of a closed graphite crucible to provide their own atmosphere, and (b) in flowing Argon. Bars (55 millimeters (mm)×6 mm×5 mm) were sintered in flowing Ar at 2000° C. for 5 minutes. The heating rate for all specimens was approximately 50° C./minute. Specimens sintered above 1900° C. exhibited closed porosity, with shrinkage, density, hardness, and fracture toughness of specimens as given in Table 1. The strength of bars in four point bending (using an inner span of 20 mm and an outer span of 40 mm with a crosshead speed of 0.5 mm/minute) at room temperature was 525 MPa. Optical microscopy showed that three phases were present in the sintered ceramic bodies with no differences between samples sintered inside and outside the closed crucible. Electron microscopy showed that the average grain size was approximately 2 micrometers.

TABLE 1

| Example | Sintering Temperature (°C.) | Shrinkage (%) | Density (g/cc) | Hardness (GPa) | Fracture Toughness (MPa.m$^{\frac{1}{2}}$) |
| --- | --- | --- | --- | --- | --- |
| 1 | 1850$^a$ | 13.4 | 3.10 | — | — |
| 2 | 1900$^a$ | 15.0 | 3.20 | 19.9 | 3.3 |
| 3 | 1940$^a$ | 16.1 | 3.30 | 24.6 | 3.0 |
| 4 | 2000$^a$ | 16.2 | 3.33 | 25.3 | 3.7 |
| 5 | 2000$^b$ | 16.5 | 3.25 | 26.4 | 4.7 |
| 6 | 2100$^b$ | 15.3 | 3.18 | 24.1 | — |

$^a$Sintered inside closed graphite crucible.
$^b$Sintered in flowing Argon.

EXAMPLE 7

Silicon Carbide (371.8 g), $Al_2O_3$ (18.0 g), and $Y_2O_3$ (10.2 g) were processed and sintered as in Example 5. The density of the sintered ceramic was 3.30 g/cc, hardness was 25.3 GPa. The material was similar in all other respects to Example 5. The fracture toughness remained unchanged.

EXAMPLE 8

Silicon Carbide (224.0 g), $TiB_2$ (Hermann C. Starck Co., 104.7 g), $Al_2O_3$ (30.6 g), and $Y_2O_3$ (17.4) were processed and sintered as in Examples 1–7. The density of the sintered ceramic was 3.84 g/cc, hardness was 18.9 GPa.

EXAMPLE 9

Silicon Carbide SiC (358.8 g), $Al_4C_3$ (Hermann C. Starck, 23.4, $Al_2O_3$ (11.5 g), and $Y_2O_3$ (6.36 g) were milled, pressed, and sintered as in Examples 1–5. The yttria doped SiC-$Al_2O_3$ specimens showed 13.7% shrinkage, a density of 3.02 g/cc, hardness of 21.3 GPa, and fracture toughness of 3.7 MPa.m$^{\frac{1}{2}}$ when sintered at 2000° C. within the closed graphite crucible. When the same composition was sintered under identical conditions except without containment, the shrinkage was 13.6%, density was 2.86, hardness was 22.9 GPa, fracture toughness was 4.3 MPa.m$^{\frac{1}{2}}$. In order to show that $Y_2O_3$-$Al_2O_3$ aided sintering, an identical SiC-$Al_2OC$ composition (without $Y_2O_3$-$Al_2O_3$ substituted for $Al_2O_3$) was sintered in each case. The specimen sintered within the crucible had shrinkage of 12.7%, density of 3.03 g/cc, and hardness of 20.5 GPa. The specimen sintered outside the closed crucible had shrinkage of 12.3%, density of 2.71 g/cc, however hardness was not determined. The strength of $Y_2O_3$ doped SiC-$Al_2OC$ was 463 MPa when sintered in flowing Ar. The rare earth oxide-alumina apparently contributes to a liquid phase at a lower temperature than the $Al_2O_3$-$Al_4O_4C$ liquid, which promotes sintering in the SiC-$Al_2OC$ system, thus aiding sintering of SiCAlON ceramics.

The present invention is unique in the following respects:

1. Rare earth oxides and alumina are used to provide a liquid phase at temperatures above 1600° C. which promotes sintering of SiC. Fine grain size (less than 10 microns) and low porosity result from the pressureless sintering process, yielding hardnesses greater than 23 GPa as tested by indentation with a Vicker's indenter at loads in excess of 50 Newtons. Hardness values above 23 GPa were previously attainable only using hot pressing or using SiC in excess of 98% with added boron and carbon to aid solid state sintering. The present invention yielded ceramic bodies having hardness values greater than 25 GPa at SiC levels of 86% by weight.

2. Due to the presence of the liquid phase, sintering occurs rapidly. This rapid sintering allows for sintering schedules with lower temperatures and for shorter times than those conventionally used. The present invention can be obtained by heating the composition to approximately 1950° C. (150° to 200° C. lower than that conventionally used) for 10 minutes (20 to 110 minutes shorter than that conventionally used). More importantly, it is believed that the present invention will allow 1–5 micron SiC to be sintered, where heretofore no sintering occurred using traditional sintering aids. Previous inventions (e.g., U.S. Pat. Nos. 4,502,983, 4,564,490, and 4,569,921) used added rare earth oxides, typically as liquids, to coat the surface of submicron SiC thereby enhancing solid state sintering. These techniques failed to take advantage of liquids in the rare earth oxide-alumina system and hence did not obtain materials having high hardness and improved wear resistance. The present invention, in contrast, does not leave the surface of sintered components rich in rare earth oxides. The liquid phase of the present invention wets the surfaces of SiC particles during the sintering step, and results in a uniform distribution of aluminum and rare earth containing compounds throughout the ceramic body's microstructure.

3. The liquid phase which aids sintering in the present system also promotes sintering in SiCAlON ceramics. It allows for second phase additives, such as $TiB_2$, as in conventionally sintered alpha SiC. It is believed that the liquid phase will also allow other additives, such as "whiskers" (a single crystals with a long aspect ratio), to be added during sintering. Rapid sintering is ideal for use with materials such as whiskers which have limited stability at temperatures in excess of 1850° C. Boron and carbon additions are not required to sinter SiC in the present invention. Both alpha and beta silicon carbide of any polytype can be used in the present invention.

Numerous variations and modifications of the present invention will be recognized by those skilled in the art. For example, $3Y_2O_3.5Al_2O_3$, a compound containing Y, Al, and O, could be substituted for $Y_2O_3$ and $Al_2O_3$ and still provide the liquid phase to promote sintering.

We claim:

1. A process for liquid phase sintering of silicon carbide comprising:

forming a mixture consisting essentially of silicon carbide particles having a size of from about 2 to about 5 microns and from about 0.5 percent to about 19.5 percent by weight of a rare earth oxide and from about 0.5 percent to about 19.5 percent by weight alumina;

forming a shape with said mixture; and sintering said mixture at a temperature of from about 1700° to about 2200° centigrade for about 1 minute to about 30 minutes to form a liuqid phase and a resultant sintered ceramic body having a hardness exceeding about 22 GPa comprising 2% to 20% by weight of a compound wherein the molar ratio of rare earth oxide to alumina in said compound is at least three to five and from about 80% to about 98% by weight silicon carbide.

2. The process of claim 1 wherein said silicon carbide particles are alpha phase silicon carbide particles.

3. The process of claim 1 wherein said silicon carbide particles are beta phase silicon carbide particles.

4. The process of claim 1 wherein said silicon carbide particles comprise a mixture of alpha phase and beta phase silicon carbide particles.

5. The process of claim 1 wherein said sintering temperature is between about 1900° and 2100° centigrade.

6. The process according to claim 1 wherein said mixture of silicon carbide particles, rare earth oxide and alumina is sintered for for about 1 minute to less than 15 minutes.

7. The process according to claim 1 including hot isostatically pressing said densified mixture at a pressure and for a period of time to increase the density of said sintered body.

8. The process of claim 1 including hot isostatically pressing said densified mixture at a pressure and for a period of time to increase the density of said sintered silicon carbide body to greater than about 99% of theoretical.

9. The process of claim 8 wherein said sintering and hot isostatic steps are combined so that a green ceramic body is first sintered to a state of closed porosity in a pressure of less than about 15 MPa and said resultant ceramic body is then pressurized at pressures of at least 35 MPa to reduce the porosity.

10. A sintered ceramic body comprising a uniform mixture of:

from about 80% to about 98% by weight silicon carbide, and from about 2% to about 23% by weight of a compound, said compound comprising: alumina, and a rare earth oxide, wherein the molar ratio of rare earth oxide to alumina in said compound is at least three to five, and wherein said sintered ceramic body has a density greater than 95% of theoretical, and a hardness greater than 20 GPa.

11. The sintered ceramic body of claim 10 wherein said molar ratio of rare earth oxide to alumina is at least 1:1.

12. The sintered ceramic body of claim 11 wherein said molar ratio of rare earth oxide to alumina is 2:1.

13. The sintered ceramic body of claim 10 wherein said rare earth oxide is $Y_2O_3$.

14. The sintered ceramic body of claim 13 wherein the silicon carbide has average grain sizes of less than ten micrometers.

15. The sintered ceramic body of claim 10 wherein said compound of rare earth oxide and alumina comprises less than 10 percent by weight of the sintered ceramic body.

16. The sintered ceramic body of claim 10 wherein said ceramic body has a hardness which exceeds 23 GPa.

17. The sintered ceramic body of claim 10 wherein said sintered ceramic body has a hardness which exceeds 26 GPa.

* * * * *

UNITED STATES PATENT OFFICE
CERTIFICATE OF CORRECTION

Patent No. 4,829,027  Dated May 9, 1989

Inventor(s) Raymond A. Cutler, Anil V. Virkar, Andrew C. Hurford

It is certified that error appears in the above-identified patent and that said Letters Patent is hereby corrected as shown below:

In column 1, line 32, delete "application" and insert therefor --applications--.
In column 2, line 48, delete "10%" and insert therefor --19.5%--.
In column 2, line 58, delete "(Hip" and insert therefor --(HIP--.
In column 2, line 59, delete "Ping)" and insert therefor --ping--.
In column 3, line 7, delete "time" and insert therefor --times--.
In column 3, line 35, delete "(In)" and insert therefor --In--.
In column 3, line 37, delete "are" and insert therefor --or--.
In column 3, line 53, delete "of".
In column 3, line 54, after "temperatures" insert --of--.
In column 3, line 55, delete "pointof" and insert therefor --point of--.
In column 4, line 13, delete "xelt-" and insert therefor --melt- --.
In column 5, line 36, delete "(Hipped)" and insert therefor --(HIPped)--.
In column 8, line 31, delete "liuqid" and insert therefor --liquid--.
In column 9, line 2, delete "23%" and insert therefor --20%--.
In column 9, line 10, delete "20" and insert therefor --23--.

Signed and Sealed this

Twenty-fourth Day of July, 1990

Attest:

HARRY F. MANBECK, JR.

*Attesting Officer*  *Commissioner of Patents and Trademarks*